March 17, 1959 R. TRALLI 2,878,462
AUXILIARY VEHICLE LIGHT
Filed Feb. 4, 1958 2 Sheets-Sheet 1

INVENTOR
*Rocco Tralli*

BY
*Kimmel & Crowell*
ATTORNEYS

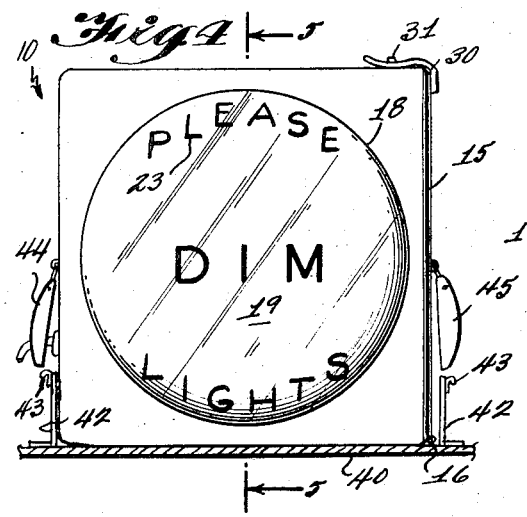
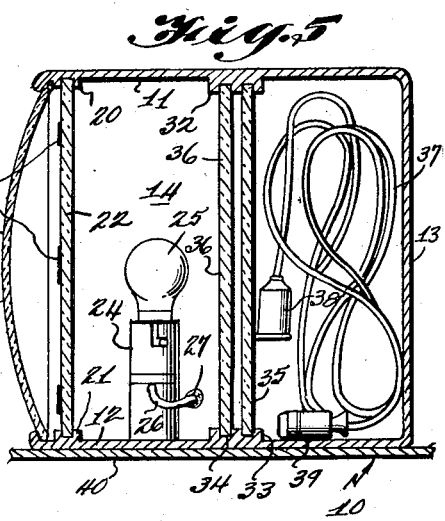
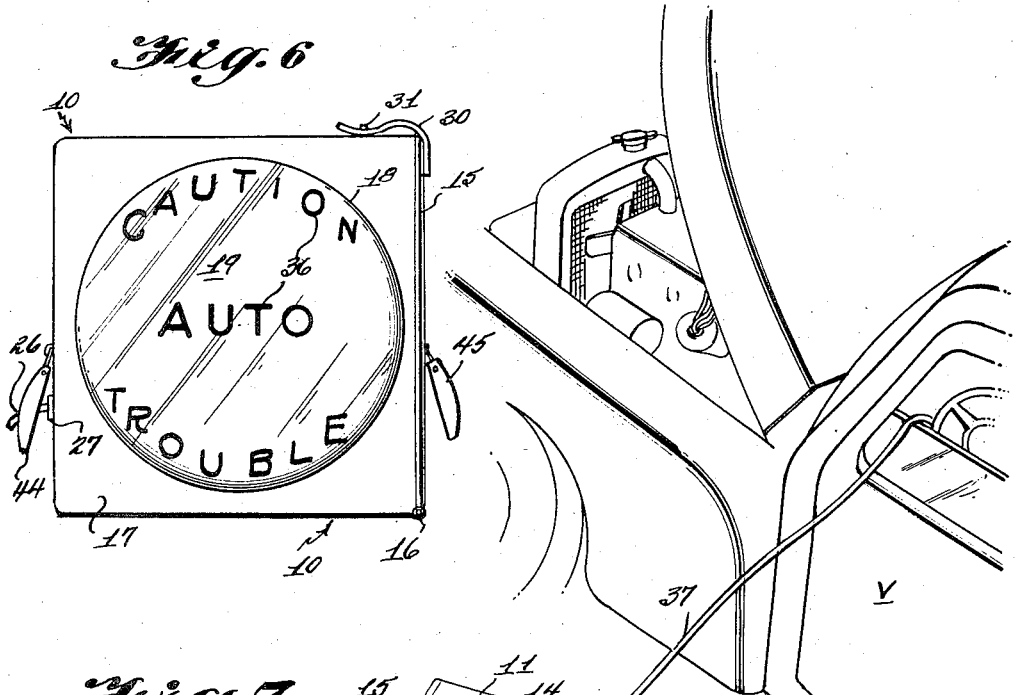
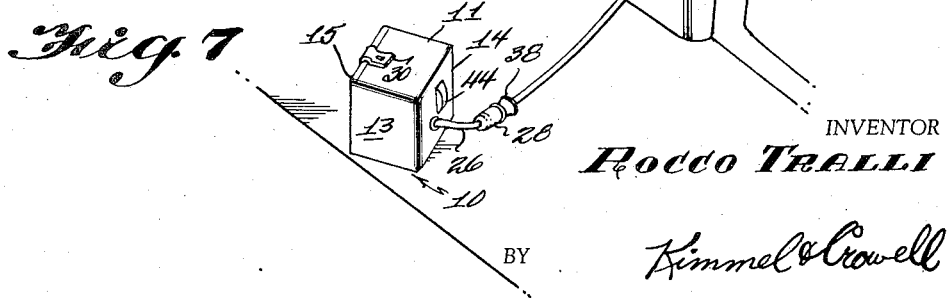

1

2,878,462
AUXILIARY VEHICLE LIGHT
Rocco Tralli, Manchester, Conn.

Application February 4, 1958, Serial No. 713,167

1 Claim. (Cl. 340—107)

The present invention relates to auxiliary vehicle lights, and particularly to auxiliary vehicle lights which can be used as trouble lights, caution lights, and signal lights interchangeably.

The primary object of the invention is to provide an auxiliary light for motor vehicles detachably secured to the rear of the vehicle and detachably connected to the electric circuits of the vehicle.

Another object of the invention is to provide an auxiliary light for motor vehicles having interchangeable indicia panels for indicating selectively a particular condition.

A further object of the invention is to provide a light for motor vehicles which can be connected to the cigarette lighter outlet of the vehicle when desired.

Other objects and advantages will become apparent in the following specification when considered in the light of the attached drawings, in which:

Figure 4 is a front elevation of the invention.

Figure 5 is a longitudinal vertical section taken along the line 5—5 of Figure 4, looking in the direction of the arrows.

Figure 6 is a view similar to Figure 4 illustrating a second indicia panel in position.

Figure 7 is a perspective view of the invention shown in use as a trouble light for illuminating the area of the trouble.

Figure 1:
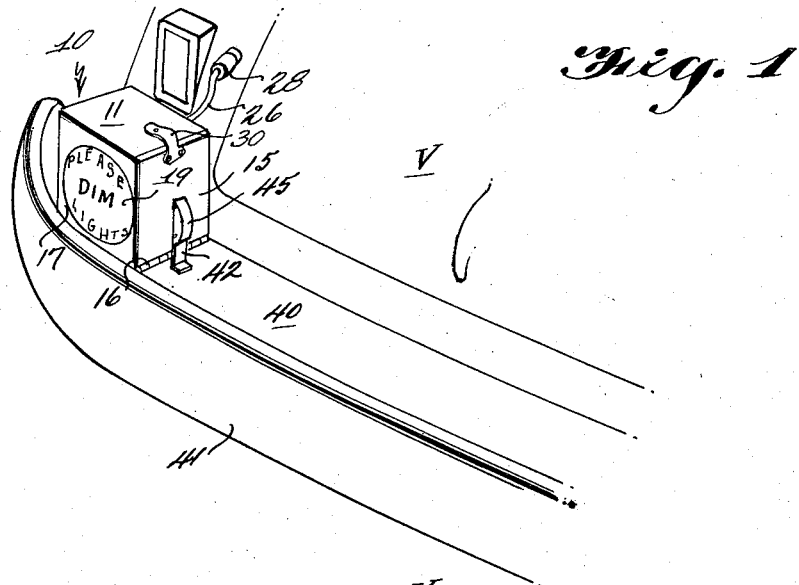
Figure 1 is a fragmentary perspective view of the invention attached to the rear of a vehicle.

Referring now to the drawings in detail wherein like reference characters indicate like parts throughout the several figures, the reference numeral 10 indicates generally an auxiliary light constructed in accordance with the invention.

The auxiliary light 10 comprises a generally rectangular housing having a top wall 11, bottom wall 12, rear wall 13, side wall 14, and a door 15. The door 15 is hingedly secured at 16 to the bottom wall 12 on the side thereof opposite the side wall 14. A front wall 17 is secured to the side wall 14, top wall 11, and bottom wall 12 in parallel relation to the rear wall 13 and is provided with a central circular opening 18 having a clear glass lens 19 secured therein.

Immediately rearwardly of the front wall 17, a U-shaped track 20 is secured to the top wall 11 parallel to the front wall 17. A second U-shaped track 21 is secured to the bottom wall 12 in underlying relation to the U-shaped track 20. A transparent panel 22 is slidably arranged in the U-shaped tracks 20, 21 and has indicia 23 on one surface thereof.

A light socket 24 is secured to the bottom wall 12 intermediate the side wall 14, and the door 15, and has a light bulb 25 positioned therein. A wire 26 extends from the socket 24 through a waterproof grommet 27 in the side wall 14 terminating in a plug 28 detachably engaged in a socket 29 in a motor vehicle V.

The door 15 is provided with a spring clip 30 on its upper edge and the clip 30 is engageable over a pin 31 on the top wall 11 to detachably secure the door 15 in closed position.

Intermediate the rear wall 13 and front wall 17, and parallel thereto, is a channeled track member 32 secured to the top wall 11, and a second channel track member 33 secured in aligned relation thereto to the bottom wall 12. The channel track members 32, 33 are each provided with a plurality of trackways, and transparent panels 34, 35 are stored therein, as best shown in Figure 5.

The panel 34 has indicia 36 thereon, while the panel 35 is tinted any desired color to provide a tinted light when desired. The panels 34, 35 are interchangeable with the panels 22 so as to be positioned between the lens 19 and the light 25.

An extension cord 37 is positioned in the auxiliary light 10 being removable by opening the door 15. The extension cord 37 is provided with a female socket 38 and a male socket 39. The male socket 39 can be plugged into the conventional cigarette lighter outlet of a motor vehicle or the socket 29 to permit the auxiliary light 10 to be used in any desired position about the motor vehicle.

The light 10 is normally mounted on the dust panel 40 extending horizontally between the motor vehicle V and the rear bumper thereof 41. A pair of brackets 42 having hooks 43 on the upper ends are secured to the dust panel 40 in spaced parallel relation with sufficient space therebetween for the light 10.

A spring clasp 44 is secured to the side 14 of the light 10, and a second spring clasp 45 is secured to the door 15. The spring clasps 44, 45 are engageable with the hooks 43 of the brackets 42 to detachably secure the light 10 thereto.

Figure 3:
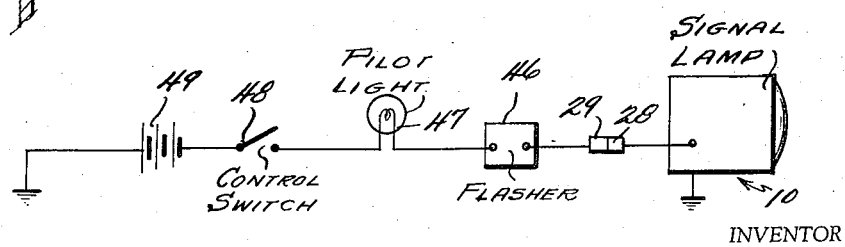
Figure 3 is a semi-diagrammatic wiring diagram used with the invention.

The light 10 is normally plugged into the socket 29 at the rear of the vehicle V and the socket 29 is connected to a flasher 46, a pilot light 47, a control switch 48, and a battery 49, all as shown in Figure 3. The control switch 48 is positioned for convenient access to the driver of the vehicle V, and the pilot light 47 is mounted on the dashboard of the vehicle to be readily visible to the driver.

Figure 2:
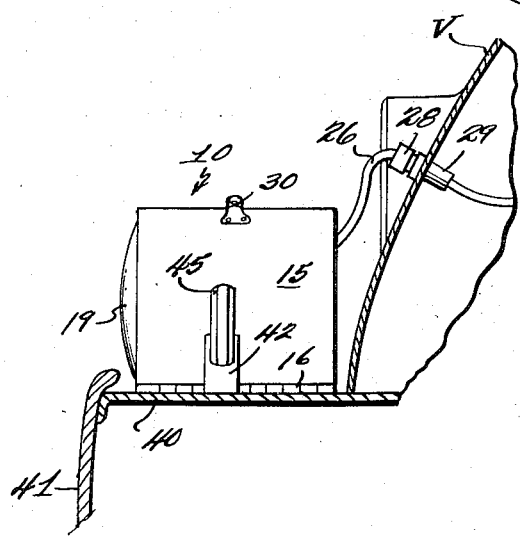
Figure 2 is a side elevation of the invention shown attached to a motor vehicle with the vehicle shown partly broken away and in section for convenience of illustration.

When the auxiliary light 10 is positioned as illustrated in Figures 1 and 2, the panel 22 having the indicia Please Dim Lights thereon is arranged to be visible rearwardly of the vehicle V.

When a driver to the rear of the vehicle V blinds the driver of the vehicle V with his high beam headlights, the driver of the vehicle V closes the switch 48 causing the bulb 25 to be turned off and on by the flasher 46 illuminating the indicia Please Dim Lights.

When the vehicle V is stalled in a dangerous position, the panel 34 is substituted for the panel 22, and the extension cord 37 is connected to the light 10 and to the socket 29. The light 10 is then moved rearwardly as far as the extension cord 37 permits, and the indicia Caution Auto Trouble is flashed off and on to the rear of the vehicle V.

When it is desired to use the auxiliary light 10 to illuminate the trouble area of a car, such as a flat tire, the indicia panel 22 is removed and the extension cord 37 is plugged into the cigarette lighter socket of the motor vehicle, and the auxiliary light 10 is positioned so that the light from the bulb 25 falls on the work. With the extension cord 37 plugged into the cigarette lighter socket of the motor vehicle V, the flasher 46 is by-passed and the light from the bulb 25 will be steady.

Having thus described the preferred embodiment of the invention, it should be understood that numerous struc- tural modifications and adaptations may be resorted to without departing from the scope of the appended claim.

What is claimed is:

An auxiliary light for motor vehicles comprising a housing, a light mounted in said housing, said housing having an opening through one wall thereof, an indicia carrying transparent panel, means releasably supporting said indicia carrying panel between the opening in said wall and said light, said housing having a second opening through a second wall thereof, a door hingedly secured to said housing closing said second opening, means in said housing accessible through said second opening for storing a plurality of indicia panels therein, a plurality of resilient clasp means mounted in opposed relation on said housing for detachably securing said housing to a motor vehicle, and flexible means extending from the light in said housing for electrically and detachably connecting said light to a selected socket on said motor vehicle.

References Cited in the file of this patent

UNITED STATES PATENTS

| | | |
|---|---|---|
| 2,580,938 | Martin | Jan. 1, 1952 |
| 2,731,628 | Campanella | Jan. 17, 1956 |
| 2,812,423 | Penna | Nov. 5, 1957 |